US005665190A

United States Patent [19]

Sansano Sanz

[11] Patent Number: 5,665,190

[45] Date of Patent: Sep. 9, 1997

[54] MOLDED WOODEN PANEL FOR DECORATIVE COVERINGS

[76] Inventor: Agustin Sansano Sanz, Ctra. Calig. KM. 3.5, Benicarlo (Castellon), Spain, 12580

[21] Appl. No.: 389,734

[22] Filed: Feb. 15, 1995

Related U.S. Application Data

[62] Division of Ser. No. 133,600, Oct. 7, 1993, abandoned.

[30] Foreign Application Priority Data

Oct. 8, 1992 [ES] Spain ..................................... 9202002

[51] Int. Cl.$^{6}$ ................................ B32B 31/00; E04C 2/12

[52] U.S. Cl. .......................... 156/154; 156/268; 156/219; 156/313; 156/311.1; 156/270

[58] Field of Search .................................... 52/473, 311.1, 52/311.2, 311.3, 309.9, 254, 255, 270, 312, 313, 314; 156/268, 257, 154, 219; 144/350, 365, 364

[56] References Cited

U.S. PATENT DOCUMENTS

| | | | |
|---|---|---|---|
| 299,382 | 5/1884 | Hale | 52/311.1 |
| 351,116 | 10/1886 | Mankey | 52/312 |
| 2,091,476 | 8/1937 | Elmendorf | 52/313 |
| 2,829,404 | 4/1958 | Wilson | 52/313 |
| 3,654,044 | 4/1972 | Hirota | 156/268 X |
| 4,073,672 | 2/1978 | Clarke et al. . | |
| 4,288,954 | 9/1981 | O'Donnell | 52/313 |
| 4,544,440 | 10/1985 | Wheeler . | |
| 4,610,900 | 9/1986 | Nishibori . | |
| 4,704,834 | 11/1987 | Turner | 52/311.2 |
| 4,731,139 | 3/1988 | Feyerabend et al. | 156/154 |
| 4,736,559 | 4/1988 | Young | 52/313 |
| 5,157,886 | 10/1992 | Azzar et al. | 52/312 |
| 5,213,872 | 5/1993 | Yamamoto | 52/312 |
| 5,242,519 | 9/1993 | Wu | 156/154 |
| 5,295,339 | 3/1994 | Manner | 52/313 |

FOREIGN PATENT DOCUMENTS

| | | | |
|---|---|---|---|
| 0309356 | 3/1989 | European Pat. Off. | 144/344 |
| 833699 | 3/1952 | Germany . | |
| 22 60 123 | 3/1974 | Germany . | |
| 39 23 555 | 2/1990 | Germany . | |
| 0043254 | 11/1978 | Japan | 52/313 |
| A-54-6700 | 5/1979 | Japan . | |
| 56-33953 | 4/1981 | Japan . | |
| 58-108101 | 6/1983 | Japan . | |
| 59-111836 | 6/1984 | Japan . | |
| 1057301 | 3/1986 | Japan | 144/344 |
| 171244 | 4/1976 | New Zealand . | |
| 2 014 163 | 6/1990 | Spain . | |
| 8500318 | 1/1985 | WIPO | 144/344 |

*Primary Examiner*—Carl D. Friedman
*Assistant Examiner*—Winnie Yip
*Attorney, Agent, or Firm*—Darby & Darby

[57] ABSTRACT

A decorative panel is formed with a flexible or rigid support of different thicknesses and material depending on where same is to be placed attached to a wooden sheet by means of a layer of adhesive. The sheet is milled to define some segments whose repetition gives rise to the motif. Channels in which the sheet is very thin are formed between said segments so that the resulting panel is flexible and is not easily broken due to said channels, whereby the panel adapts in the best way to the different shapes that the application surface may have.

3 Claims, 1 Drawing Sheet

MOLDED WOODEN PANEL FOR DECORATIVE COVERINGS

This is a division of application Ser. No. 08/133,600, filed Oct. 7, 1993 now abandoned.

OBJECT OF THE INVENTION

Just as is expressed in the title of this specification, the present invention refers to a decorative converting panel whose purpose is to provide a decorative and covering means of different surfaces, though these surfaces are curved or include different planes.

The invention is especially applicable to the covering and decorating furniture, walls, columns, ships, dividers or the like, though it can be applied to any surface which is to be protected and ornamented.

BACKGROUND OF THE INVENTION

Different types of coverings for different surfaces are known which permit the same to have their aesthetic aspect improved or to provide a means of protection. Most of them are used for very specific purposes and thus their field of application is very restricted.

Besides, these coverings are very difficult or impossible to apply to curved surfaces or surfaces that include different planes.

DESCRIPTION OF THE INVENTION

In order to achieve the purposes and to avoid the above cited inconveniences, the invention consists of a decorative covering panel that has a more or less flexible or rigid support such as cloth, plastic, cardboard, fibers laminate metals or the like with any thickness, depending on where the same is to be placed.

A sheet that is preferably made out of wood and mechanized so that it has a plurality of segments separated by channels in which said sheet will be thinner is adhered to this support. The repetition of these segments gives rise to the motif of the panel.

All the segments remain joined forming a single piece, but the connections between them, defined by the cited channels, permit the flexibility thereof without the same breaking, thus it is possible to apply the panel to very curved surfaces, as well as to surfaces with different planes.

In manufacturing the panels of the invention, first of all an adhesive is applied to the support and afterwards the wooden panel is placed thereon. Then, the entirety formed by the support, adhesive and sheet is pressed to achieve total adherence of the sheet to the support. Finally, once the wooden sheet and the support are strongly connected, the surface of the wooden sheet is milled with the details that are desired and establishing the different segments and channels, so that between segment and segment of the motif that is represented there is a thinner area or channel in the wooden sheet.

Due to the possible flexible nature of the support and the arrangement in segments of the motif of the sheet, the panels of the invention have the advantage of being able to adapt to any surface although the surface is very curved or includes sharp changes of planes. Besides, the panels can be easily cut along the channels of separation between the segments. All of this makes the uses of these panels very extensive without reducing their efficacy in each specific case. On the other hand the simplicity of the manufacturing processes makes it possible to obtain top quality panels at low prices.

Hereinafter, to provide a better understanding of this specification and forming an integral part of the same, a single figure in which the object of the invention has been represented in an illustrative and non-restrictive manner is attached hereto.

DESCRIPTION OF THE EMBODIMENT OF THE INVENTION

Figure 1:
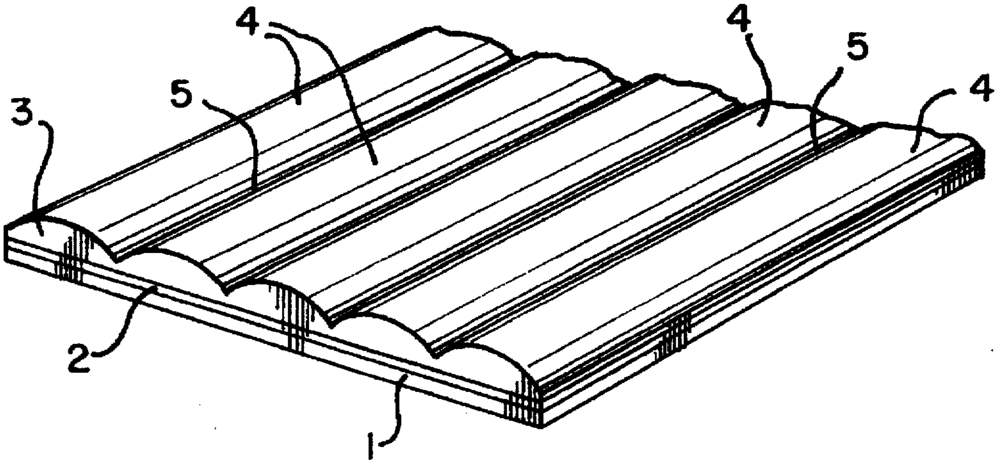
FIG. 1 represents a perspective view of the decorative covering panel of the embodiment of the present invention, the thickness of support (1) and of the layer of adhesive (2) having been exaggerated.

Hereinafter the description of an example of the invention is made referring to the numbers used in the figure.

Hence, the decorative covering panel of this embodiment has a flexible cloth support (1) to which a wooden sheet (3) is fastened by means of a layer of adhesive (2.)

The wooden sheet (3) is mechanized so that a series of segments (4), whose repetition forms a motif, is defined, separated by channels (5) in which the thickness of the sheet (3) is much smaller.

The segments (4) of this embodiment of the invention have a constant section with the top curviconvex edge, but likewise they can have other geometric features, as long as between said segments (4) channels (5) in which the thickness of the wooden sheet (3) is small are established.

It must be like this so that the connections between the segments (4) are flexible without easily breaking, so that the panel has a considerable flexibility when so required.

These panels can be applied to surfaces with different planes or curved ones as a result thereof.

The manufacturing of said panels consists of applying the adhesive layer (2) on the support (1) and placing the sheet (3) thereon before making the segments (4) and channels (5) in it. Then, said components are pressed to achieve greater adherence.

Figure 2:
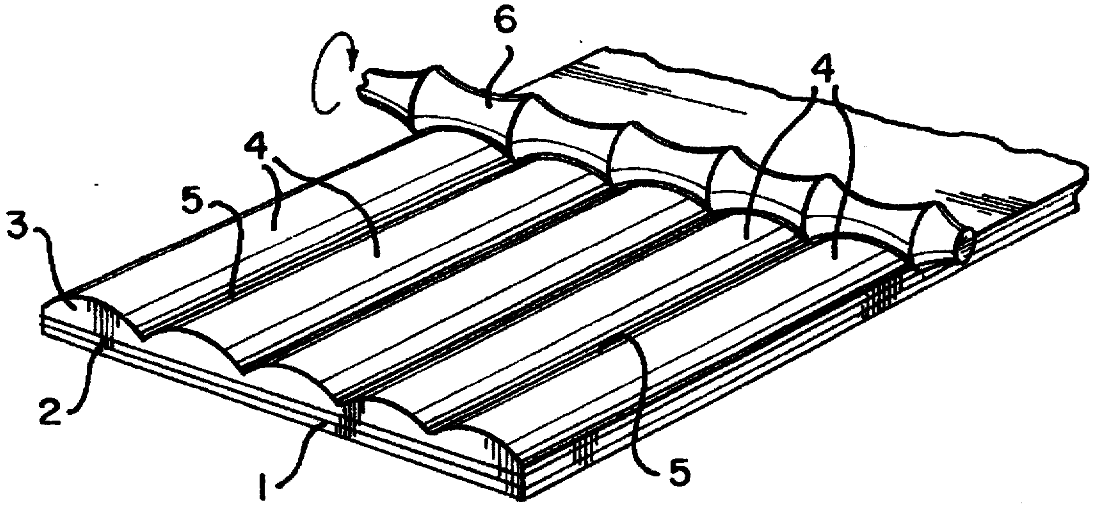
FIG. 2 shows a conventional milling device (6) treating wooden sheet (3) to form segments and channels.

As illustrated in FIG. 2, the support (1) is strongly connected to the sheet (3), the latter is milled by a milling device (6) to form the segments (4) and the channels (5.)

What is claimed:

1. A method of making a panel for decorative coverings, comprising the steps of:
   - applying an adhesive layer to one of a flexible support and a wooden sheet;
   - placing said wooden sheet on said flexible support so that said adhesive layer is disposed between said wooden sheet and said flexible support;
   - applying pressure to said wooden sheet and said flexible support such that a greater adherence is obtained; and
   - treating said wooden sheet by milling such that different segments having preselected geometric features are formed, a plurality of channels being formed between adjacent segments, the thickness of the wooden sheet being considerably smaller at said channels than a maximum thickness of said wooden sheet such that the resulting panel is flexible and will adapt perfectly, without breaking, to curved surfaces or to surfaces having different planes.

2. A method according to claim 1, wherein said segments have a section with a convex top.

3. A method according to claim 1, wherein said wooden sheet, after said treating step, covers substantially the entire flexible support.

* * * * *